US009383886B2

(12) United States Patent
Lee et al.

(10) Patent No.: US 9,383,886 B2
(45) Date of Patent: Jul. 5, 2016

(54) DISPLAY DEVICE PROVIDING HISTORY INFORMATION AND METHOD FOR CONTROLLING THE SAME

(71) Applicant: LG ELECTRONICS INC., Seoul (KR)

(72) Inventors: Doyoung Lee, Seoul (KR); Eunhyung Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 235 days.

(21) Appl. No.: 14/282,766

(22) Filed: May 20, 2014

(65) Prior Publication Data

US 2015/0278990 A1    Oct. 1, 2015

(30) Foreign Application Priority Data

Mar. 25, 2014  (KR) .................. 10-2014-0034721

(51) Int. Cl.
*G06F 3/048* (2013.01)
*H04M 1/725* (2006.01)
*H04M 1/02* (2006.01)

(52) U.S. Cl.
CPC ........... *G06F 3/048* (2013.01); *H04M 1/72522* (2013.01); *H04M 1/0214* (2013.01); *H04M 1/0235* (2013.01); *H04M 1/0245* (2013.01); *H04M 1/0268* (2013.01); *H04M 1/7253* (2013.01)

(58) Field of Classification Search
CPC ... G06F 3/048; H04M 1/0214; H04M 1/0235; H04M 1/0245
USPC ........................................................ 715/708
See application file for complete search history.

(56) References Cited

U.S. PATENT DOCUMENTS

| 5,918,014 | A  | * | 6/1999  | Robinson ............... G06Q 30/02 706/12 |
| 7,424,476 | B2 | * | 9/2008  | Apparao ........... G06F 17/30884 |
| 7,552,390 | B1 | * | 6/2009  | Sherer .................. G06F 19/322 715/744 |
| 7,672,969 | B1 | * | 3/2010  | Gawdiak ............... G06Q 10/00 707/999.102 |
| 7,730,416 | B2 | * | 6/2010  | Ueda ..................... G06F 3/0481 715/733 |
| 7,945,247 | B2 |   | 5/2011  | Nam et al. |
| 8,051,388 | B2 | * | 11/2011 | Toki ....................... G11B 27/34 715/810 |
| 8,208,954 | B1 | * | 6/2012  | Fujisaki ................. H04N 7/147 455/419 |
| 8,418,054 | B2 |   | 4/2013  | Ikegami |
| 8,456,424 | B2 |   | 6/2013  | Katsura |
| 8,510,655 | B2 |   | 8/2013  | Lee et al. |
| 8,560,967 | B2 |   | 10/2013 | Heo |
| 8,606,594 | B2 | * | 12/2013 | Stern ..................... G06F 19/322 705/2 |
| 9,075,500 | B2 | * | 7/2015  | Hess ..................... G06F 3/0481 |
| 9,232,044 | B2 | * | 1/2016  | Park .................. H04M 1/72583 |

(Continued)

*Primary Examiner* — David Phantana Angkool
(74) *Attorney, Agent, or Firm* — Birch, Stewart, Kolasch & Birch, LLP

(57) ABSTRACT

A method for controlling a display device, comprising, executing a first application and displaying an execution screen of the first application on a display unit, wherein the display unit includes a first display area and a second display area, and the execution screen of the application is displayed in at least one of the first display area and the second display area; and displaying a history screen including history information of the first application, wherein the history information is set up based upon a display mode, wherein first history information is displayed when the display mode of the first application corresponds to a single area mode, second history information is displayed when the display mode of the first application corresponds to an expand area mode, wherein the first history information has a display property different from the display property of the second history information.

20 Claims, 16 Drawing Sheets

(56) References Cited

U.S. PATENT DOCUMENTS

| | | | | |
|---|---|---|---|---|
| 2006/0229806 A1* | 10/2006 | Forlenza | ............ | G01C 21/3484 701/411 |
| 2009/0070541 A1* | 3/2009 | Yochai | .................. | G06F 3/0605 711/165 |
| 2010/0070899 A1* | 3/2010 | Hunt | ................. | G06F 17/30861 715/769 |
| 2010/0095219 A1* | 4/2010 | Stachowiak | ...... | G06F 17/30884 715/745 |
| 2015/0278990 A1* | 10/2015 | Lee et al. | ................ | G06F 3/048 345/665 |

* cited by examiner

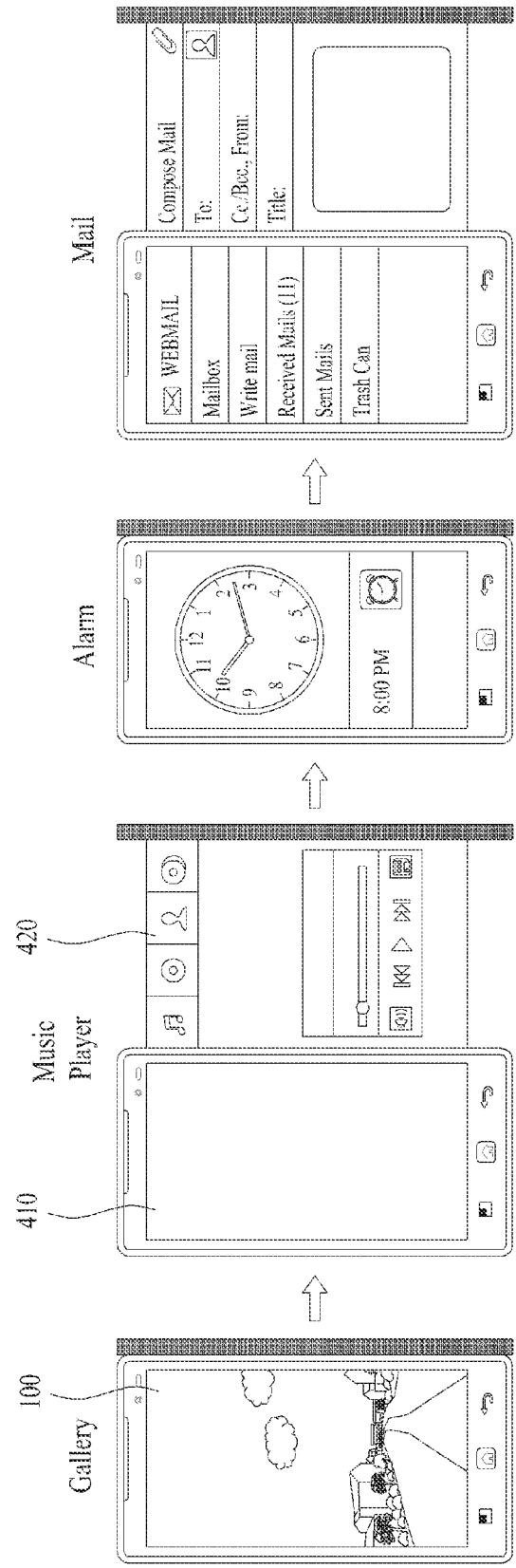

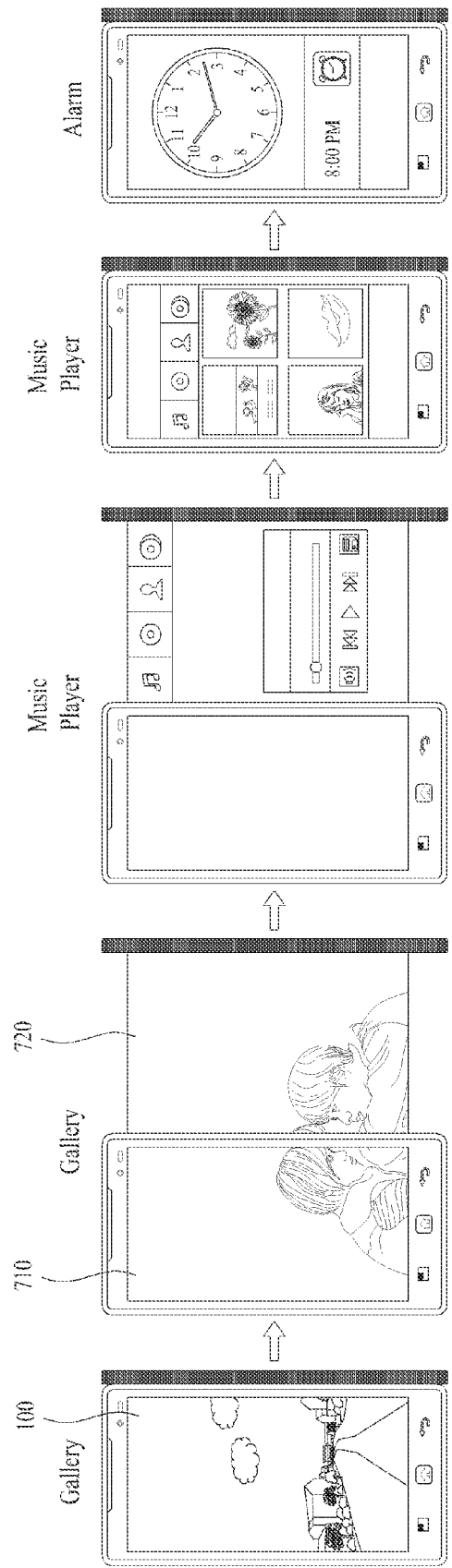

DISPLAY DEVICE PROVIDING HISTORY INFORMATION AND METHOD FOR CONTROLLING THE SAME

Pursuant to 35 U.S.C. §119(a), this application claims the benefit of the Korean Patent Application No. 10-2014-0034721, filed on Mar. 25, 2014, which is hereby incorporated by reference as if fully set forth herein.

BACKGROUND OF THE INVENTION

1. Field of the Invention

This specification relates to a display device providing history information and a method for controlling the same. And, most particularly, this specification relates to a method of a display device for providing history information corresponding to an execution screen of an application, which is displayed in multiple display areas.

2. Discussion of the Related Art

A display device may execute an application and may display visual information corresponding to the executed application. At this point, the display device may provide history information corresponding to an execution screen through which the application is being executed. Additionally, the display device may include multiple display areas. The display device may be designed and fabricated to be foldable. The display device may include a rollable display area and may be equipped with a separate display area. Moreover, the display device may be configured of a flexible material and may be divided into multiple display areas. Recently, the display device has been designed to include multiple display areas and to be capable of simultaneously multiple sets of visual information to a user. Among the multiple display areas of the display device, the display device may display an execution screen of an executed application on some of the display areas. At this point, in case the display device provides history information, due to a difference in the areas wherein application execution screens are being displayed, the history information corresponding to the application execution screen and the conventional history information are required to be provided differently. More specifically, the display device is required to perform a method of providing the user with history information corresponding to a display area in which the application execution screen is being displayed, among the multiple display areas.

SUMMARY OF THE INVENTION

Accordingly, this specification is directed to a display device providing history information and a method for controlling the same that substantially obviate one or more problems due to limitations and disadvantages of the related art.

An object of the display device is to include multiple display areas and to provide history information based upon an area in which an execution screen of an application is being displayed.

Additionally, another object of the display device is to provide a method of differently displaying display properties of the history information.

Additionally, yet another object of the display device is to provide a method for adjusting positions in which the history information is being displayed based upon the area in which the application execution screen is being displayed.

Additionally, yet another object of the display device is to provide a method for adjusting a size of the history information based upon the area in which the application execution screen is being displayed.

Additionally, yet another object of the display device is to provide a method for executing multiple applications and displaying multiple sets of history information.

Additionally, yet another object of the display device is to provide a method for executing multiple display modes and displaying multiple sets of history information.

Additionally, yet another object of the display device is to provide a method for categorizing history information based upon display properties of the history information.

Finally, a further object of the display device is to provide a method for displaying an application execution screen on an external device and displaying history information corresponding to the external device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device includes a display unit configured to display an execution screen of an application, wherein the display unit includes a first display area and a second display area, and the execution screen of the application is displayed in at least one of the first display area and the second display area, a sensor unit configured to detect an input signal and to deliver the detected input signal to a processor, and the processor configured to display a history screen including history information corresponding to the executed application, wherein the history information is set up based upon a display mode, and the display mode is set up based upon a display area in which the execution screen of the executed application is being displayed, wherein the processor is further configured to execute a first application, when a trigger signal configured to display the history screen is detected, display first history information if the display mode of the first application corresponds to a single area mode, and display second history information if the display mode of the first application corresponds to an expand area mode, and wherein the first history information has a display property different from the display property of the second history information.

It is to be understood that both the foregoing general description and the following detailed description of this specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4a and FIG. 4b illustrate a method of the display device for displaying history information based upon an area in which an application execution screen is being displayed according to an exemplary embodiment of this specification;

FIG. 7a to FIG. 7c illustrate a method of the display device for displaying history information based upon a display mode according to an exemplary embodiment of this specification;

DETAILED DESCRIPTION OF THE INVENTION

Hereinafter, the exemplary embodiments will be described in detail with reference to the accompanying drawings and the contents indicated in the accompanying drawings. However, the scope of this specification will not be limited to or limited by the exemplary embodiments presented herein.

In addition, although the terms used in this specification are selected from generally known and used terms, the terms used herein may be varied or modified in accordance with the intentions or practice of anyone skilled in the art, or along with the advent of a new technology. Alternatively, in some particular cases, some of the terms mentioned in the description of this specification may be selected by the applicant at his or her discretion, the detailed meanings of which are described in relevant parts of the description herein. Furthermore, it is required that this specification is understood, not simply by the actual terms used but by the meaning of each term lying within.

In this specification, a display device 100 may refer to an electronic device that is configured to detect user input and to display visual information on a display unit. More specifically, the display device 100 may correspond to a smart phone, a smart pad, a tablet PC, a PDA, a notebook (or laptop) computer, and so on. Moreover, the display device 100 may correspond to a device configured to detect a user's control input and to display visual information, and this will not be limited only to the exemplary embodiments presented herein.

Additionally, the display device 100 may include multiple display areas. More specifically, the display device 100 may display multiple sets of visual information on multiple display areas that can be differentiated from one another. This will be described in more detail later on with reference to FIG. 3a to FIG. 3c.

Figure 1:
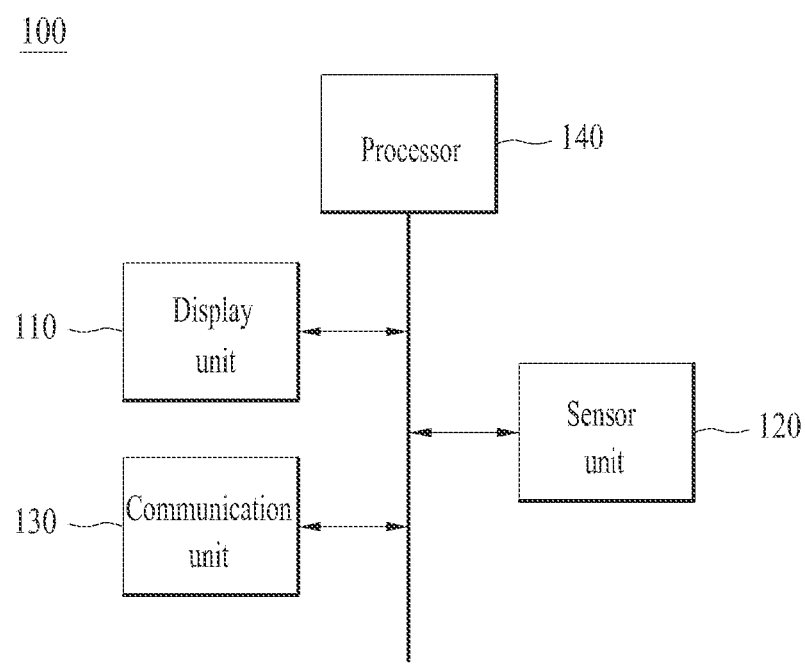
FIG. 1 illustrates a block view of a display device according to an exemplary embodiment of this specification.

FIG. 1 illustrates a block view of a display device according to an exemplary embodiment of this specification. The display device 100 may include a display unit 110, a sensor unit 120, a communication unit 130 and a processor 140.

The display unit 110 may display visual information. More specifically, the display unit 110 may display an execution screen of an application (i.e., an application execution screen). At this point, an application may correspond to contents being executed by the display device 100. Additionally, for example, the application may correspond to software being executed by the display device 100. Moreover, the application may correspond to a program including visual information and being designed to be displayed on the display unit 110. However, this will not be limited only to the exemplary embodiments presented herein. In case the display device 100 executes an application, the display device 100 may display an application execution screen on the display unit 110. At this point, the display unit 110 may include a first display area and a second display area. The display device 100 may selectively display the application execution screen on only one of the first display area and the second display area. Additionally, the display device 100 may display the application execution screen on both the first display area and the second display area. Moreover, for example, the display device 100 may execute a first application and a second application. The display device 100 may activate both the first application and the second application. At this point, activation may refer to a state in which the display device 100 can directly detect the user's control input. The display device 100 may display the first application on the first display area and may display the second application on the second display area. More specifically, the display unit 110 may selectively display the application execution screen on multiple display areas.

Additionally, for example, the display unit 110 may include a first display unit and a second display unit. At this point, the first display unit may include the first display area, and the second display unit may include the second display area. At this point, the second display unit may correspond to a unit configured to receive information on the execution of the application and to display the application execution screen. This will be described in more detail later on with reference to FIG. 9.

Furthermore, for example, the display unit 110 may correspond to a touch sensitive display unit. A touch sensitive display unit may provide the user with visual information and may detect the user's touch input. According to the exemplary embodiment, the display unit 110 may include at least one of an organic light-emitting diode (OLED), a liquid crystal display (LCD), electrophoretic ink (e-ink), a head mount display (HMD), and a flexible display.

The sensor unit 120 may detect an input signal and my deliver the detected input signal to a processor. At this point, the input signal may correspond to at least one of a touch input, an inclination of the display device, an input of an input device, a voice input, and a gesture input. Additionally, the input signal may correspond to a control input of the user for controlling the display device, and examples of the input signal will not be limited only to the above-described exemplary embodiments presented herein. Furthermore, the sensor unit 120 may include an input device (not shown) configured to detect the input signal.

For example, the sensor unit 120 may detect diverse control inputs by using at least one of a touch sensor, a gyro sensor, an acceleration sensor, an image sensor, and a voice recognition sensor, and examples of the sensor unit will not be limited only to the above-described exemplary embodiments presented herein. The sensor unit 120 may deliver the detected input signal to the processor, and the processor may control the display device 100 by using the received input signal.

The communication unit 130 may perform communication with an external device by using diverse protocols and may transmit/receive data accordingly. Additionally, the communication unit 130 may access a network via wired or wireless connection and may transmit/receive digital data, such as contents.

At this point, for example, the display device 100 may control the second display unit by using the communication unit 130 and may display execution information of an executed application.

Additionally, for example, the display device 100 may selectively include the communication unit 130. More specifically, when the display device 100 does not perform communication with an external device, the display device 100 may not include the communication unit 130.

The processor 140 may display a history screen, which includes history information of an application that is being executed, by using the display device 100. At this point, the history information may correspond to information having its display properties respective to the information on the application, which is executed by the display device 100, modified. Herein, the display properties may correspond to at least one of size, shape, and display position of the history information. Moreover, the display property may correspond to a color in which the history information is being displayed, a related phrase (or text), and so on. More specifically, the display property may correspond to information configured to indicate information on the corresponding application. However, examples of the display property will not be limited only to the above-described exemplary embodiments.

Additionally, the history information may be set up (or determined) based upon a display mode. At this point, the display mode may be set up based upon a display area in which the display device 100 displays the visual information. More specifically, the display mode may correspond to a single area mode. The single area mode may correspond to a display mode configured to selectively display visual information on any one of the first display area and the second display area. More specifically, in the single display mode, the display device 100 may display visual information on only one of the multiple display areas. Additionally, for example, the display device 100 may include multiple display areas consisting of at least two or more display areas. Herein, the single area mode may correspond to a display mode configured to display visual information on only one of the multiple display areas. In the single area mode, the display device 100 may selectively display the execution screen of the first application on any one of the first display area and the second display area.

Additionally, the display mode may correspond to an expand area mode. At this point, the expand area mode may correspond to a display mode configured to display visual information on both the first display area and the second display area. More specifically, in the expand display mode, the display device 100 may display visual information on all of the multiple display areas. Additionally, for example, the display device 100 may include multiple display areas consisting of at least two or more display areas. Herein, the expand area mode may correspond to a display mode configured to display visual information on all of the multiple display areas. Additionally, for example, when the display device 100 includes multiple display areas consisting of at least two or more display areas, the display device 100 may set up the display mode differently in accordance with the display area displaying the visual information. However, this will not be limited only to the above-described exemplary embodiment. In the expand area mode, the display device 100 may display the execution screen of the first application on both the first display area and the second display area.

As another example, the display device 100 may execute the first application and the second application. The display device 100 may display the execution screen of the first application on the first display area, and the display device 100 may display the execution screen of the second application on the second display area. More specifically, the display device 100 may execute multiple applications and may set up a display mode configured to display the execution screen corresponding to multiple applications on multiple display areas. However, this will not be limited only to the above-described exemplary embodiment. At this point, the history information may include both information corresponding to the execution screen of the first application and information corresponding to the execution screen of the second application.

Additionally, when the display mode of the first application is set to the single area mode, the processor 140 may display the first history information. And, when the display mode of the first application is set to the expand area mode, the processor 140 may display the second history information. At this point, the first history information may be set to have display properties that are different from the display properties of the second history information. Herein, as described above, the display properties may correspond to at least one of size, shape, and display position of the history information. Moreover, the display properties may vary (or may be modified) in accordance with other information corresponding to execution of the application. More specifically, the history information may have other display properties based upon the display area in which the execution screen of the corresponding application is being displayed.

Furthermore, the processor 140 may detect a trigger signal, which displays a history screen including the history information and may display the history screen. This will be described later on in more detail with reference to FIG. 2.

Additionally, the above-described elements may be included in the display device 100 as separate elements, or the above-described elements may be included in the display device 100 as an integrated elements consisting of at least one or more of the above-described elements.

Figure 2:
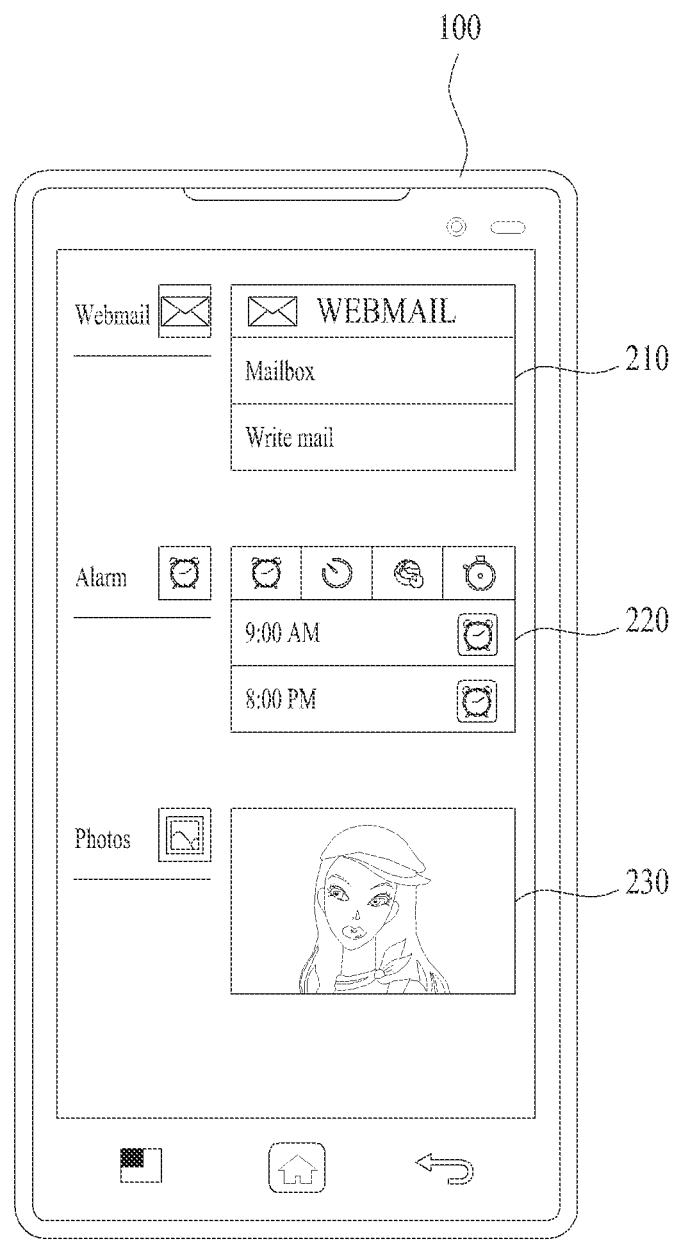
FIG. 2 illustrates a method of the display device for displaying a history screen including history information according to an exemplary embodiment of this specification.

FIG. 2 illustrates a method of the display device for displaying a history screen including history information according to an exemplary embodiment of this specification. The display device 100 may display a history screen including history information. At this point, the display device 100 may detect a trigger signal displaying the history screen. The trigger signal may correspond to a signal performing detection by using the sensor unit 120. Additionally, the trigger signal may correspond to a control input, such as a touch input, a gesture input, a voice input, and so on, and examples of the trigger signal will not be limited only to the above-described exemplary embodiments.

In case the display device 100 detects a trigger signal, which displays a history screen, the display device 100 may display the history screen. Herein, the history screen may include history information. Additionally, the history screen may display multiple sets of history information based upon an order by which the multiple applications are being executed. In case the display device 100 executes the first application before executing the second application, the display device 100 may display the first history information corresponding to the first application prior to displaying the second history information corresponding to the second application. More specifically, the display device 100 may display the first history information at a priority level higher than that of the second history information with respect to the display position, display size and shape of the history information. At this point, for example, the display device 100 may set up a reference position or a reference size, and so on, and the display device 100 may display the first history information, which is being displayed at a higher priority level than the second history information, to be most approximate to the reference position or reference size.

For example, the display device 100 may sequentially execute a first application, a second application 220, and a third application. At this point, in case the display device 100 displays a history screen, the display device 100 may display first history information 210, second history information 220, and third history information 230. Herein, for example, the display device 100 may display the first history information 210 at a priority level higher than the second history information 220. Moreover, the display device 100 may display the second history information 220 at a priority level higher than the third history information 230. At this point, the display device 100 may display the first history information 210 as the highest layer and may then display the second history information 220 as the next lower layer and the third history information 230 as the lowest layer. Alternatively, as another example, the display device 100 may display the first history information 210 as the lowest layer and may then display the second history information 220 as its higher layer and the third history information 230 as the highest layer. More specifically, the display device 100 may display the history information corresponding to the application, which is executed before any other application, at a highest priority level as compared to the other history information based upon the reference position. And, herein, the reference position may be set up differently. Furthermore, for example, the display device 100 may decide the priority level by using the reference size and by also other display properties. However, this will not be limited only to the above-described exemplary embodiment.

Figure 3A:
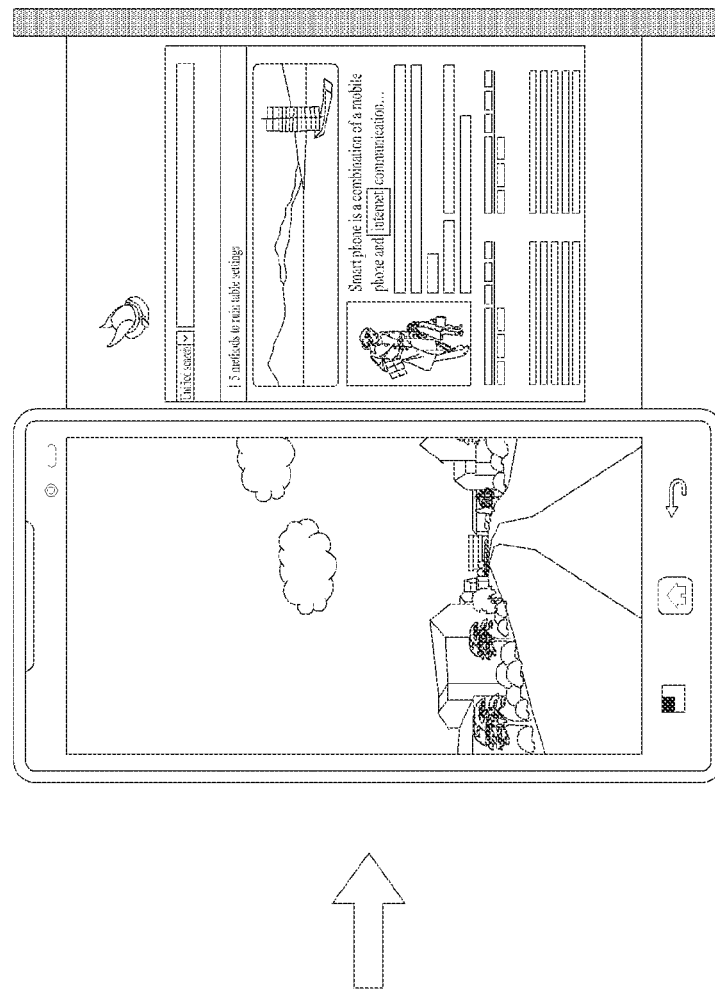
FIG. 3a to FIG. 3c illustrate a display device including multiple display areas according to an exemplary embodiment of this specification.
Figure 3A:
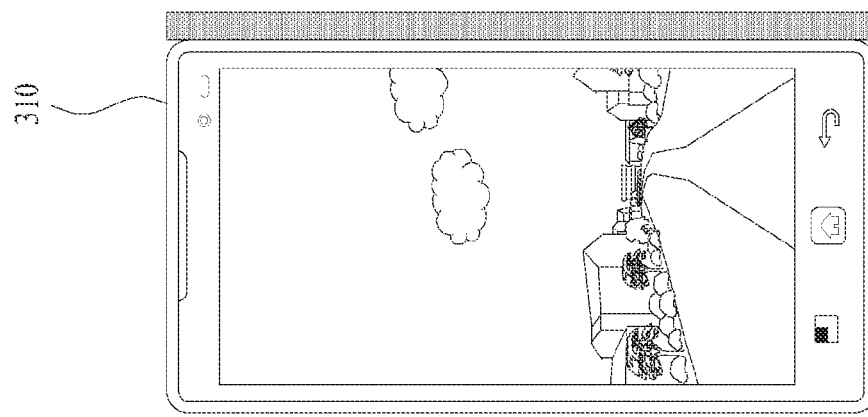
Figure 3B:
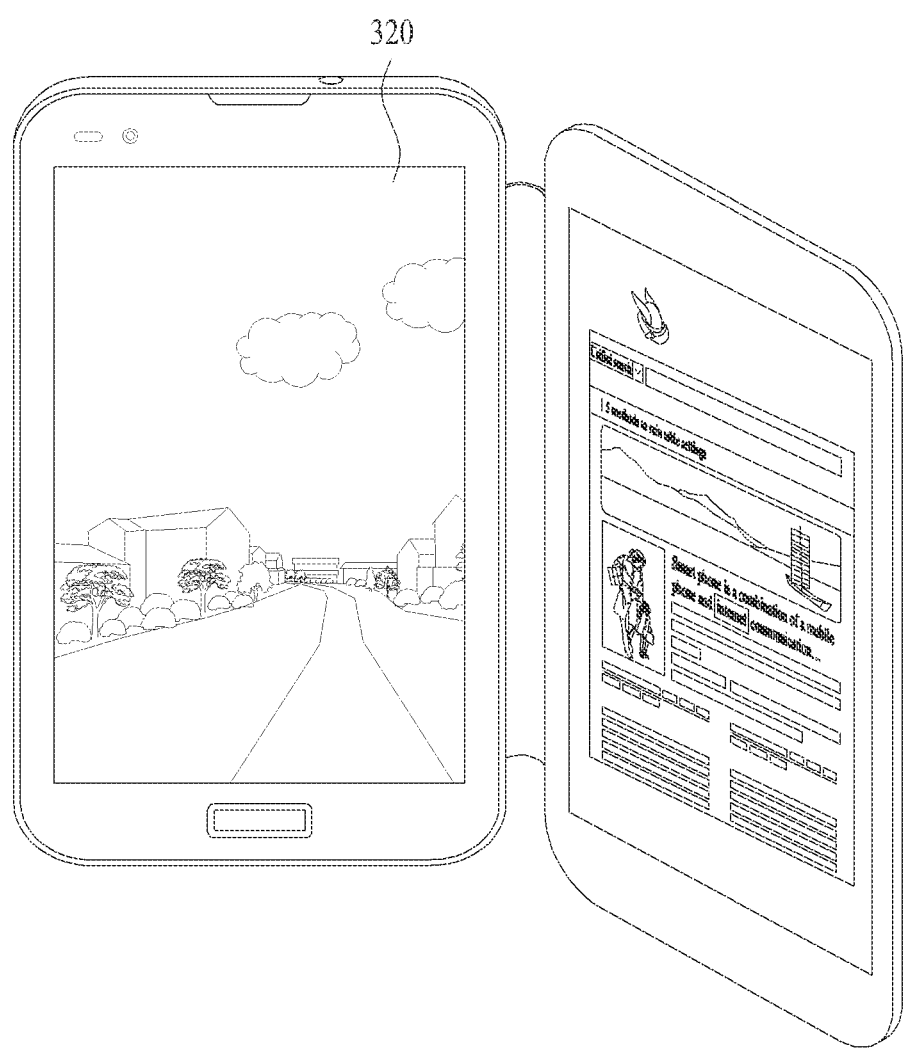
Figure 3C:
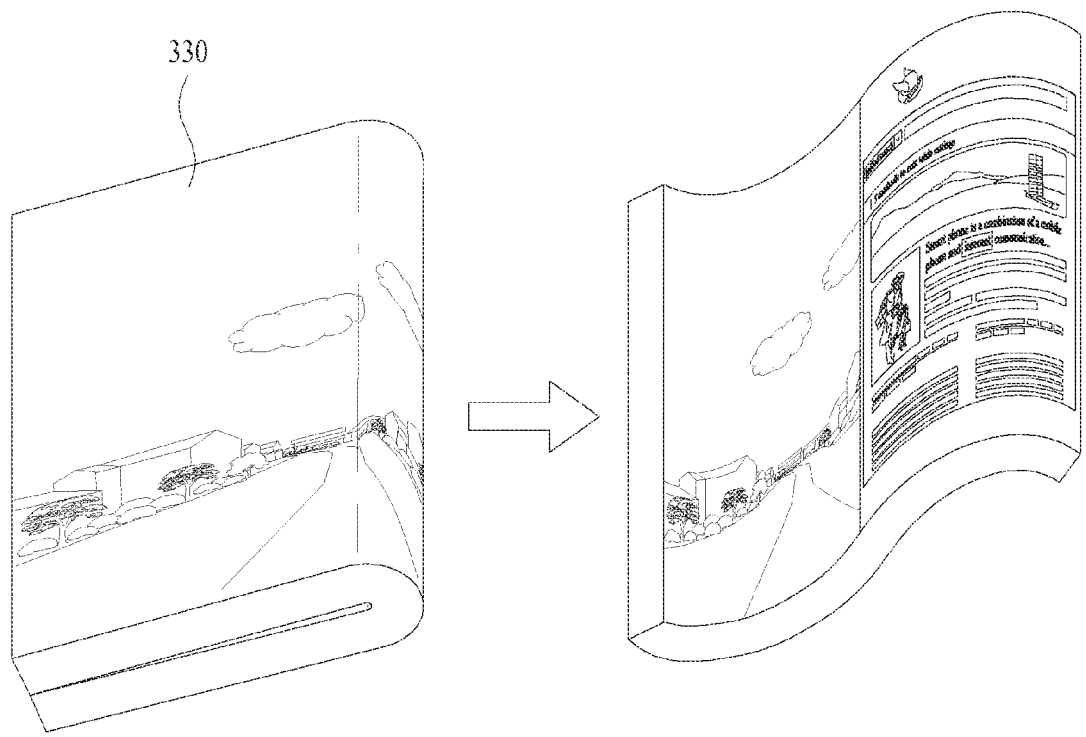

FIG. 3a to FIG. 3c illustrate a display device including multiple display areas according to an exemplary embodiment of this specification.

The display device 100 may be equipped with multiple display areas. At this point, the display device 100 may be designed and manufactured to have display areas that can be differentiated from one another. For example, the display device may be equipped with a display area that can be divided into a predetermined number of display sections. Additionally, for example, the display device 100 may include multiple display units, and a display area may be set up for each display unit, and this will not be limited only to the above-described exemplary embodiment.

For example, referring to FIG. 3a, the display device 100 may include a rollable display area. More specifically, the display device 100 may include a display area that can always be exposed. Additionally, the display device 100 may include a display area that can display visual information by initially being folded and then being exposed. Accordingly, the display device 100 may selectively (or optionally) expand the display area.

Additionally, for example, referring to FIG. 3b, the display device 100 may be designed and manufactured as a foldable device. At this point, when the display device 100 is in an unfolded state, the display device 100 may include a first display area and a second display area. More specifically, when unfolded, the display device 100 may display visual information on two display areas.

Furthermore, for example, referring to FIG. 3c, the display device 100 may be designed and manufactured by using a flexible material. At this point, the display device 100 may be divided into multiple display areas by being folded. For example, the display device 100 may be divided into multiple display areas based upon the folded part. Additionally, the display device 100 may display the visual information on front and rear surfaces of the flexible material. At this point, the display device 100 may set up each of the front surface and the rear surface as the display areas.

More specifically, the display device 100 may include multiple display areas. However, this will not be limited only to the above-described exemplary embodiment.

Figure 4B:
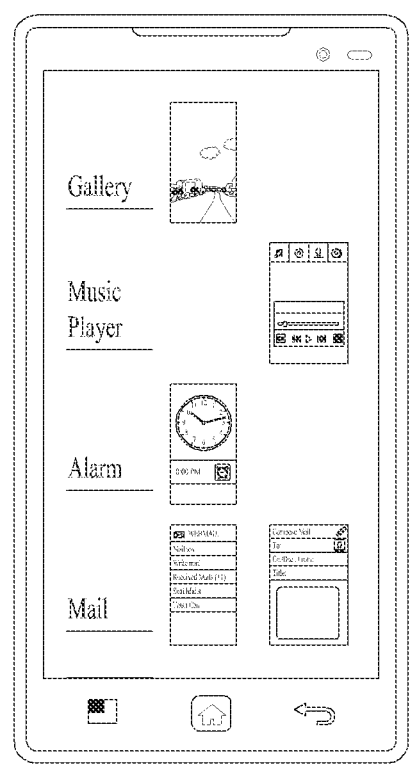

FIG. 4a and FIG. 4b illustrate a method of the display device for displaying history information based upon an area in which an application execution screen is being displayed according to an exemplary embodiment of this specification.

The display device 100 may execute an application. At this point, the display device 100 may display an execution screen of the application based upon the display mode. The display device may display the execution screen of the application in a single area mode or an expand area mode. As described above, the single area mode may correspond to a display mode configured to selectively display visual information on any one of the first display area and the second display area. Additionally, the expand area mode may correspond to a display mode configured to display visual information on both the first display area and the second display area.

The display device 100 may execute multiple applications. At this point, the display device may decide a display mode for each application and may display the corresponding execution screen. After the display device 100 executes the multiple applications, when the display device 100 detects a trigger signal, which displays a history screen, the display device 100 may display a history screen including multiple sets of history information. At this point, the multiple sets of history information may correspond to information corresponding to each of the executed applications. The history information may correspond to information reducing the application execution screen by a predetermined ratio. Herein, the predetermined ratio may be decided based upon the size of the display area. More specifically, the display device 100 may reduce the execution screen, which is displayed on the display area, at a constant ratio and may display history information in accordance with the position relation corresponding to the display area. For example, the display device 100 may determine the second display area 420 as a rollable area. At this point, depending upon a level of exposure from the folded position of the second display area 420, the display size of the application execution screen that is being displayed may vary. More specifically, when a large portion of the second display area 420 is exposed from its folded position, the execution screen may be displayed in a large display size. If the level of exposure of the second display area 420 from its folded position is increased, the display device 100 may enlarge the display size of the corresponding history information.

Additionally, the display device 100 may adjust the position in which the history information is being displayed. More specifically, in case the application execution screen is displayed only in the first display area 410, the display device 100 may display the history information corresponding to the application execution screen in a first position. Also, in case the application execution screen is displayed only in the second display area 420, the display device 100 may display the history information corresponding to the application execution screen in a second position. Moreover, in case the application execution screen is displayed in both the first display area 410 and the second display area 420, among the application execution screens, the display device 100 may display the history information corresponding to the execution screen, which is displayed in the first display area 410, in the first position. Also, in case the application execution screen is displayed in both the first display area 410 and the second display area 420, among the application execution screens, the display device 100 may display the history information corresponding to the execution screen, which is displayed in the second display area 420, in the second position. More specifically, the display device 100 may display the history information of the execution screen being displayed on the first display area 410 in the first position, and the display device 100 may display the history information of the execution screen being displayed on the second display area 420 in the second position. At this point, the first position and the second position may be decided based upon a position relation corresponding to the display area. More specifically, the first position and the second position may be set up in the same format as the position relation between the first display area 410 and the second display area 420.

For example, referring to FIG. 4a and FIG. 4b, the display device 100 may sequentially execute a Gallery application, a Music Player application, an Alarm application, and a Mail application. At this point, the display device 100 may display the execution screen of the Gallery application only in the first display area 410. And, the display device 100 may display the execution screen of the Music Player only in the second display area 420. Additionally, the display device 100 may display the execution screen of the Alarm application only in the first display area 410. Furthermore, the display device 100 may display the execution screen of the Mail application in both the first display area 410 and the second display area 420.

The display device 100 may sequentially execute the above-described application and may detect a trigger signal displaying the history screen. In case the display device 100 has displayed the history screen, the display device 100 may display the history information corresponding to the Gallery application as a highest layer in a position corresponding to the first display area 410. Thereafter, the display device 100 may display the history information corresponding to the Music Player application, which is executed after the Gallery application, under the history information corresponding to the Gallery application. At this point, the display device 100 may display the history information in a position corresponding to the second display area 420. The display device 100 may equally display the history information corresponding to the Alarm application and the history information corresponding to the Mail application. At this point, the display device 100 may display the history information corresponding to the Mail application, which is being executed in both the first display area 410 and the second display area 420, in each respective position.

Figure 5A:
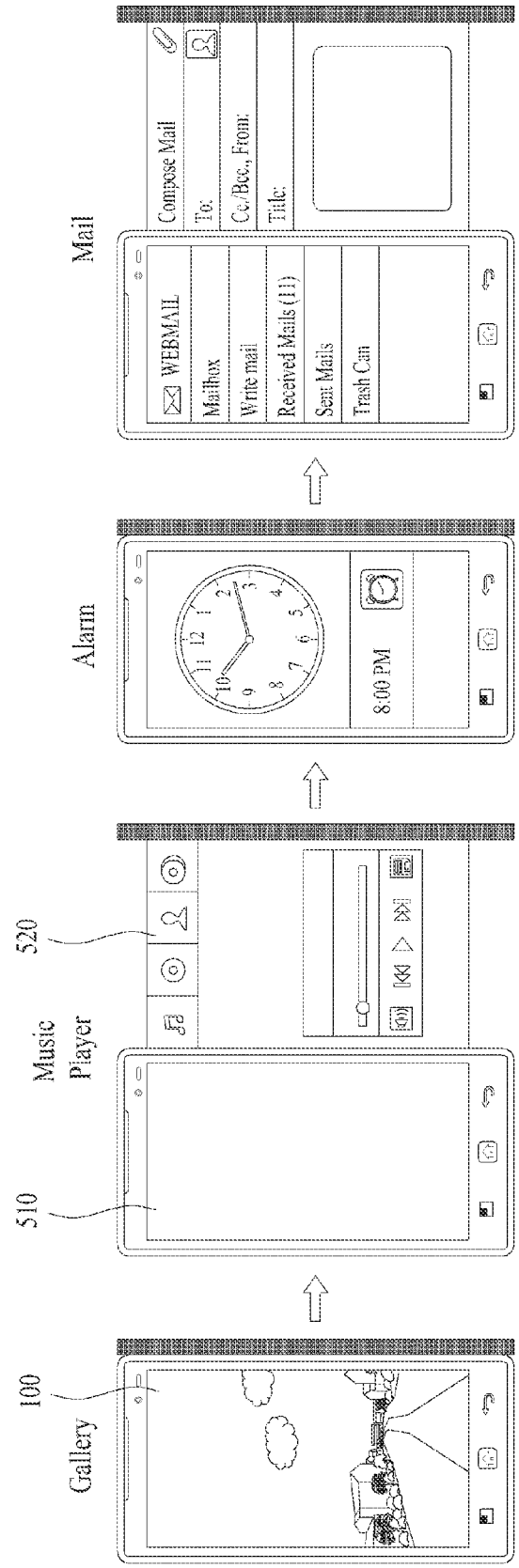
FIG. 5a and FIG. 5b illustrate a method of the display device for adjusting display positions in which history information is being displayed according to an exemplary embodiment of this specification.
Figure 5B:
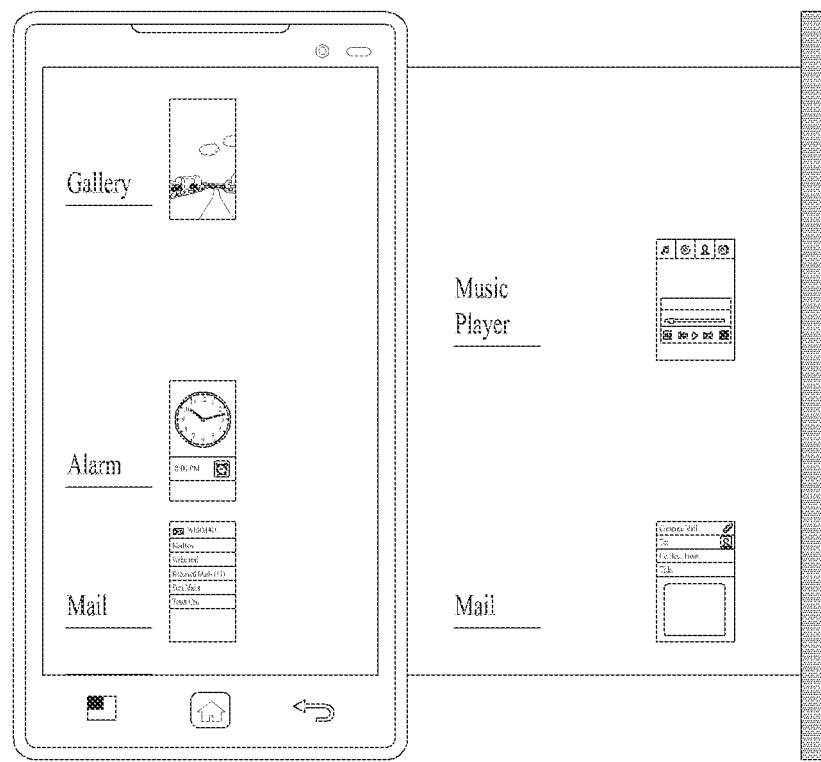

FIG. 5a and FIG. 5b illustrate a method of the display device for adjusting display positions in which history information is being displayed according to an exemplary embodiment of this specification.

The display device 100 may execute an application and may display history information based upon an area in which the execution screen of the executed application is displayed. At this point, as described above, when the execution screen of the executed application is displayed on a first display area 510, the display device 100 may display history information corresponding to the executed application in a first position. And, when the execution screen of the executed application is displayed on a second display area 520, the display device 100 may display history information corresponding to the executed application in a second position.

At this point, for example, the display device 100 may display a history screen in the single area mode. More specifically, the display device 100 may display history information in any one of the first display area 510 and the second display area 520. At this point, the first position and the second position may both be located within one of the selected areas. More specifically, the display device 100 may display history information based upon a position relation between the first position and the second position within one of the display areas in which the history screen is being displayed.

Moreover, for example, the display device 100 may display a history screen in the expand area mode. More specifically, the display device 100 may display history information by using both the first display area 510 and the second display area 520. At this point, the first position may be located in the first display area 510. And, the second position may be located in the second display area 520. More specifically, the display device 100 may display history information corresponding to an executed application in an area where the application execution screen is being displayed.

For example, referring to FIG. 5a and FIG. 5b, the display device 100 may sequentially execute a Gallery application, a Music Player application, an Alarm application, and a Mail application. At this point, the display device 100 may display the execution screen of the Gallery application only in the first display area 510. And, the display device 100 may display the execution screen of the Music Player only in the second display area 520. Additionally, the display device 100 may display the execution screen of the Alarm application only in the first display area 510. Furthermore, the display device 100 may display history information corresponding to the Mail application in both the first display area 510 and the second display area 520. When display the history information corresponding to the above-described applications, the display device 100 may prioritize the display of the history information corresponding to the application that is first executed. At this point, the display device 100 may display the history information corresponding to the Gallery application, which is displayed only in the first display area 510, in the first display area 510. More specifically, the first position may be located in the first display area 510. Additionally, the display device 100 may display the history information corresponding to the Music Player application, which is displayed only in the second display area 520, in the second display area 520. More specifically, the second position may be located in the second display area 520. Additionally, the display device 100 may display the history information corresponding to the Alarm application, which is displayed only in the first display area 510, in the first display area 510. Furthermore, the display device 100 may display the history information corresponding to the Mail application, which is displayed in both the first display area 510 and the second display area 520, in the first display area 510 and the second display area 520. At this point, the display device 100 may display the history information corresponding to an execution screen, which is displayed in the first display area 510, in the first display area 510. And, the display device 100 may display the history information corresponding to an execution screen, which is displayed in the second display area 520, in the second display area 520. More specifically, the first position may be located in the first display area 510. And, the second position may be located in the second display area 520.

Figure 6:
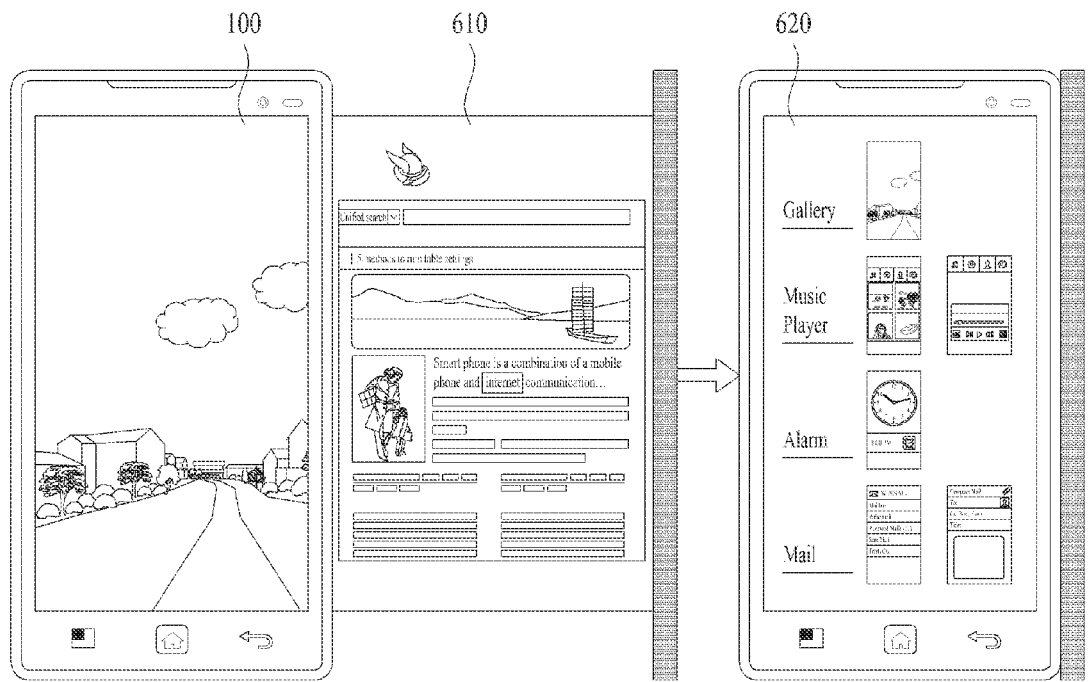
FIG. 6 illustrates a method of the display device for displaying history information based upon positions of multiple display areas according to an exemplary embodiment of this specification.
Figure 6:
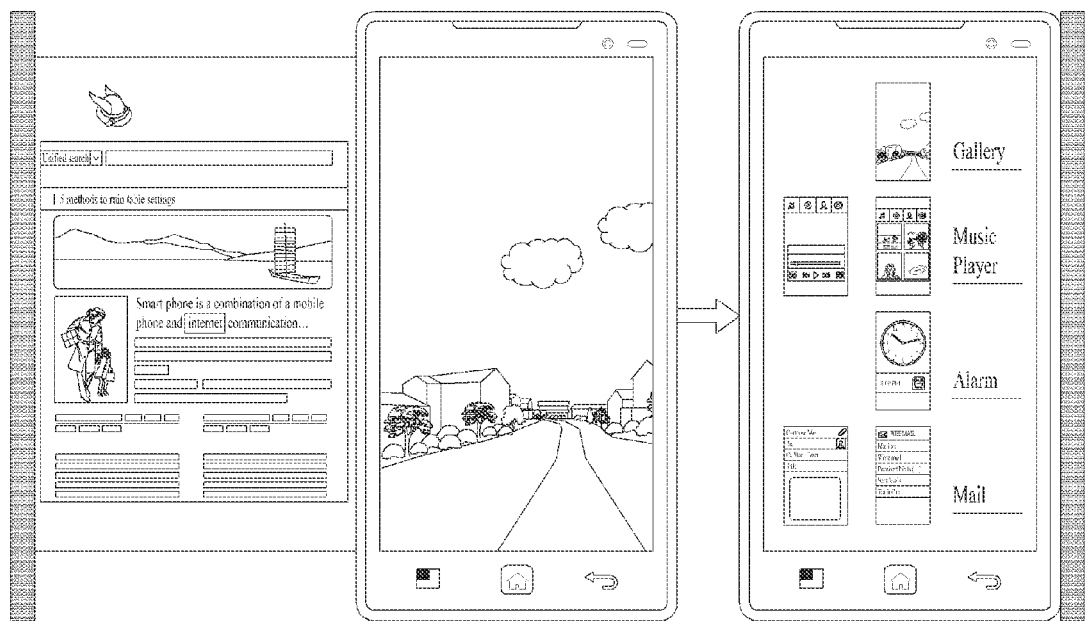

FIG. 6 illustrates a method of the display device for displaying history information based upon positions of multiple display areas according to an exemplary embodiment of this specification.

The display device 100 may control a position in which history information is being displayed in accordance with positions of a first display area 610 and a second display area 620, wherein application execution screens are being displayed. More specifically, the display device 100 may include the first display area 610 on a right side and the second display area 620 on a left side. At this point, for example, the second display area may correspond to an area being folded in the display device 100. When the second display area 620 is exposed from its folded position, the display device 100 may display visual information on the second display area 620. At this point, a position relation between the first display area 610 and the second display area 620 may be decided in accordance with a direction along which the second display area 620 is being exposed. The display device 100 may set up the above-described first position and second position based upon the position related between the first display area 610 and the second display area 620. More specifically, in case the first display area 610 is located on a left side of the second display area 620, the display device 100 may set up the first position to be located on a left side of the second position. Also, for example, in case the second display area 620 is expanded leftward so as to be exposed, the display device 100 may set up the first position to be located on the left side of the second position. More specifically, the display device 100 may display the history information based upon the position relation between the display areas. At this point, the position related between the display areas may correspond to an up-and-down relation, a left-and-right relation, and so on, and this will not be limited only to the above-described exemplary embodiment.

Referring to FIG. 6, the display device 100 may include the first display area 610. Additionally, the display device 100 may include a second display area 620, which is configured to be expanded rightward so as to be exposed. At this point, in case the display device 100 display a history screen, the display device 100 may display the history information corresponding to the second display area 620 on a right side of the history information corresponding to the first display area 610. More specifically, among the history information of the Mail application, the display device 100 may set up the history information corresponding to the second display area 620 to be positioned on the right side of the history information corresponding to the first display area 610. Alternatively, the display device 100 may include a second display area 620, which is configured to be expanded leftward so as to be exposed. At this point, among the history information of the Mail application, the display device 100 may set up the history information corresponding to the second display area 620 to be positioned on a left side of the history information corresponding to the first display area 610.

Figure 7B:
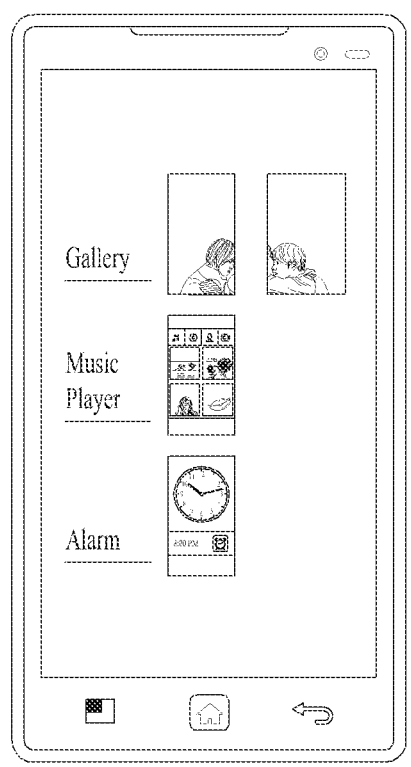
Figure 7C:
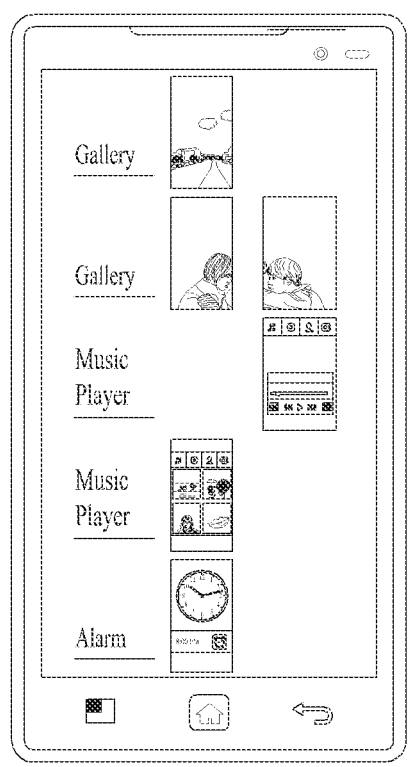

FIG. 7a to FIG. 7c illustrate a method of the display device for displaying history information based upon a display mode according to an exemplary embodiment of this specification.

The display device 100 executes an application, and the display device 100 may decide a display mode based upon an area in which the application execution screen is being displayed. At this point, the display mode may correspond to the single area mode, wherein display is provided on at least one of a first display area 710 and a second display area 720. Additionally, the display mode may also correspond to an expand area mode, wherein display is provided on both the first display area 710 and the second display area 720. At this point, the display device 100 may shift (or change) the display mode, while the application is in a state of being executed. More specifically, the display device 100 may control the area in which the application execution screen is being displayed. At this point, for example, when the second display area 720 is exposed, the display device 100 may change the display mode. Alternatively, while the application is being executed, the display device 100 may detect a trigger signal and may, then, change the display mode. More specifically, the display device 100 may change the display mode while the same application is being executed, and this will not be limited only to the above-described exemplary embodiment.

Additionally, in case the display device 100 changes the display mode while the application is being executed, the display device 100 may display the history information based upon the display mode, which is set up immediately before detecting the trigger signal, which displays a history screen.

Moreover, for example, the display device 100 may display all history information corresponding to the display mode, which is changed in the application. For example, in case the display device 100 sequentially changes multiple display modes, the display device 100 may display the history information corresponding to all display modes according to which the application is executed and set up.

Furthermore, for example, the display device 100 may continuously change the application execution mode. At this point, the display device 100 may set up the history information based upon the execution screen, which is displayed immediately before detecting the trigger signal, which displays a history screen.

Additionally, for example, in case the display device 100 sequentially changes multiple display modes, the display device 100 may display all history information based upon the execution screen, which is sequentially changed.

Additionally, for example, when the displayed area is changed in the single area mode, the display device 100 may display the history information corresponding to the changed display area. Also, the display device 100 may display all history information before and after the change in the displayed area in the single area mode.

More specifically, referring to FIG. 7a, the display device 100 may execute a Gallery application. At this point, the display device 100 may change its display mode from the single area mode to the expand area mode. Thereafter, the display device 100 may execute a Music Player application. At this point, the display device 100 may change the display area that was being displayed in the single area mode. More specifically, the display device 100 may display the application execution screen by changing the display area from the first display area 710 to the second display area 720. Finally, the display device 100 may execute an Alarm application in the single area mode. Thereafter, the display device 100 may display a history screen.

At this point, referring to FIG. 7b, the display device 100 may display history information corresponding to the expand area mode, which is the newly changed display mode in the Gallery application. More specifically, the display device 100 may not display the history information corresponding to the single area mode. Similarly, the display device 100 may display only the history information corresponding to the single area mode of the first display area 710, which corresponds to a final status set up in the Music Player application. Accordingly, the display device 100 may provide the user with history information reflecting the most recently set up display mode.

Additionally, as another example, referring to FIG. 7c, the display device 100 may display the history information corresponding to the single area mode, which corresponds to the display mode before the change in the display mode in the Gallery application, and the display device 100 may also display the history information corresponding to the expand area mode, which corresponds to the display mode after the change in the display mode in the Gallery application. At this point, for example, the display device 100 may prioritize the display of the history information corresponding to the display mode prior to (or before) the display mode change over the display of the history information corresponding to the display mode after the display mode change and may then display the prioritized history information. Moreover, in the Music Player application, which is set up to be displayed in the single area mode, the display device 100 may display both the history information corresponding to the second display area 720 before being changed and the history information corresponding to the first display area 710 after being changed. At this point, the display device 100 may prioritize the history information corresponding to the display mode prior to the change in the display mode and may display the prioritized history information.

Figure 8:
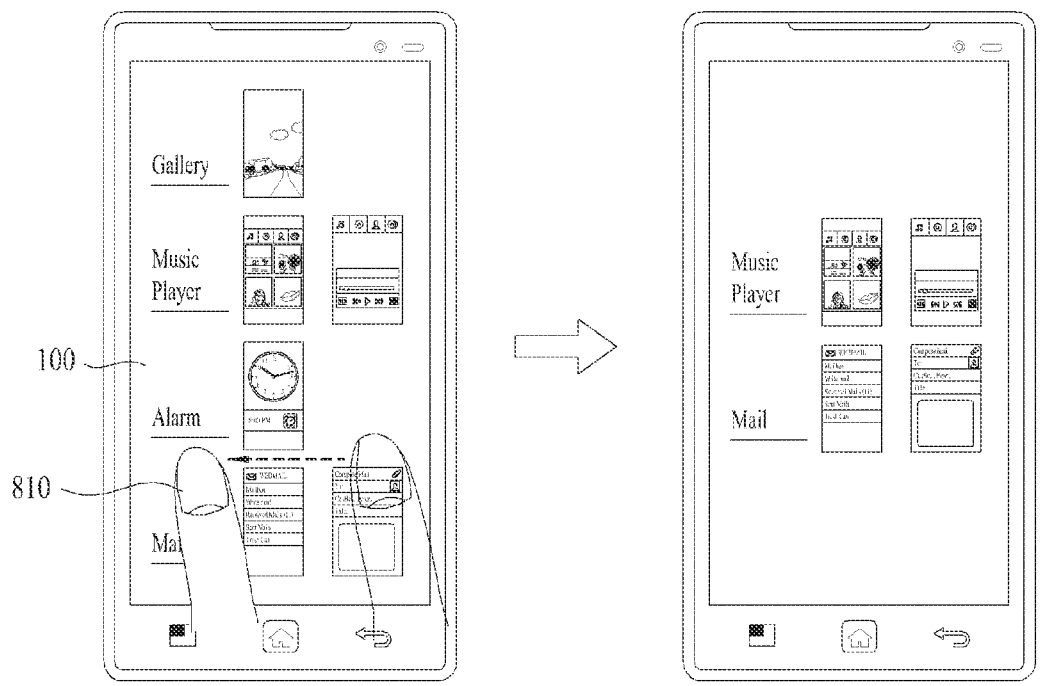
FIG. 8 illustrates a method of the display device for categorizing history information according to an exemplary embodiment of this specification.
Figure 8:
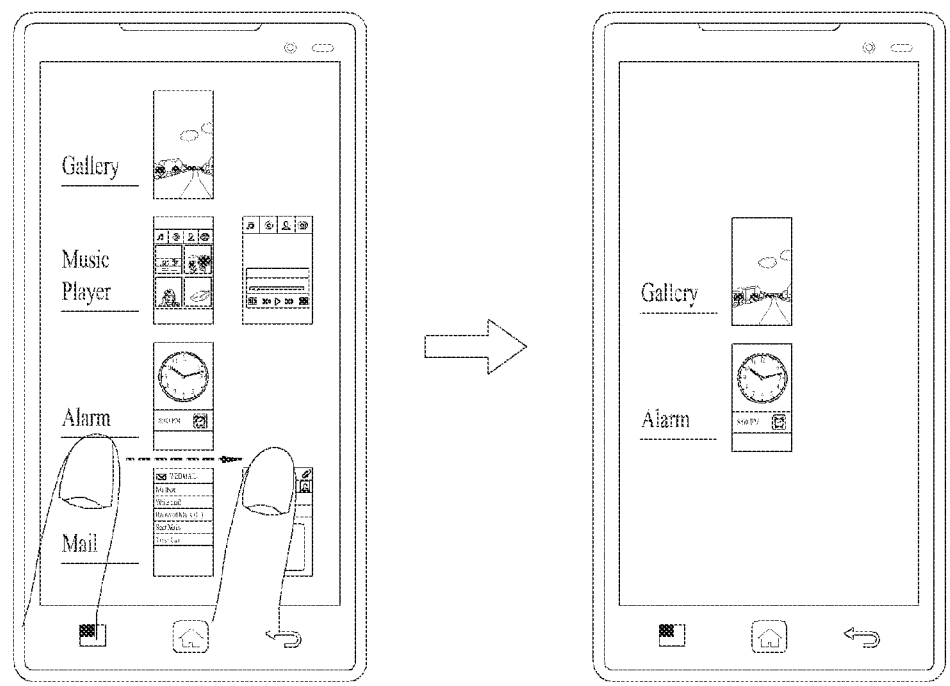

FIG. 8 illustrates a method of the display device for categorizing history information according to an exemplary embodiment of this specification.

The history information may be displayed differently depending upon the display mode based upon the display area in which the application execution screen is being displayed. Accordingly, the display device 100 may display multiple sets of history information based upon the display mode. At this point, in case the display device 100 detects a categorization trigger signal, which categorizes the history information, the display device 100 may categorize the multiple sets of history information based upon the detected categorization trigger signal by using the display properties. At this point, the categorization trigger signal may correspond to an input signal, which is detected through the sensor unit 120. For example, the categorization trigger signal may correspond to a signal being generated by at least one of a touch input, a gesture input, a voice input, and so on. In case the display device 100 detects the categorization trigger signal, the display device 100 may categorize the multiple sets of history information by using the display properties. Herein, the display properties may correspond to at least one of size, shape, and display position of the history information. The display property may be decided based upon the display mode according to which the corresponding application is being executed.

More specifically, when the display device 100 detects a first categorization trigger signal, the display device 100 may selectively display history information having a first display property. At this point, the display device 100 may delete the history information that does not have the first display property. Additionally, when the display device 100 detects a second categorization trigger signal, the display device 100 may selectively display history information having a second display property. At this point, the display device 100 may delete the history information that does not have the second display property. At this point, the first categorization trigger signal may correspond to a touch input of the user moving along a first direction. And, the second categorization trigger signal may correspond to a touch input of the user moving along a second direction. At this point, the first direction and the second direction may be opposite to one another. More specifically, the display device 100 may differentiate the categorization trigger signals from one another and may categorize the history information in accordance with the display properties. Herein, the categorization trigger signal that is being used will not be limited only to the above-described exemplary embodiment. Additionally, for example, when the display device 100 detects a categorization trigger signal, the display device 100 may categorize the history information corresponding to the display area. For example, in case the display device 100 detects a categorization trigger signal, the display device 100 may display the history information corresponding to the application execution screen, which is displayed in the first display area 810, in the first display area 810, and the display device 100 may display the history information corresponding to the application execution screen, which is displayed in the second display area 820, in the second display area 820.

For example, referring to FIG. 8, when the display device 100 detects a touch input moving leftward, the display device 100 may selectively display only the history information being executed in the expand area mode. At this point, the multiple sets of history information being executed in the expand area mode may have the same display properties. Additionally, when the display device 100 detects a touch input moving rightward, the display device 100 may selectively display only the history information being executed in the single area mode. At this point, the multiple sets of history information being executed in the single area mode may have the same display properties.

More specifically, the display device may detect a categorization trigger signal and may, then, categorize history information by using display properties based upon the detected categorization trigger signal.

Figure 9:
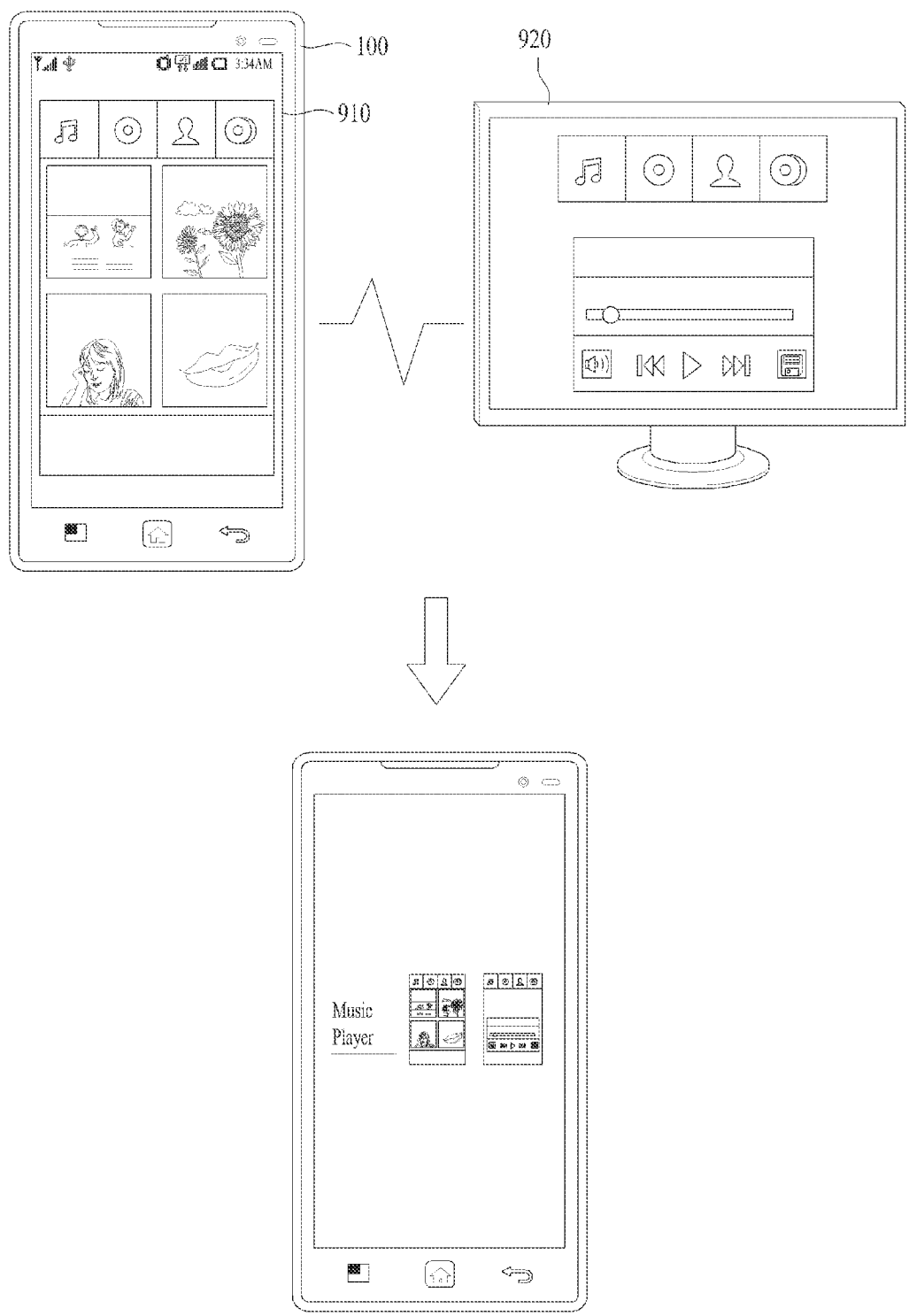
FIG. 9 illustrates a method of the display device for displaying an application execution screen on an external device and displaying respective history information according to an exemplary embodiment of this specification.

FIG. 9 illustrates a method of the display device for displaying an application execution screen on an external device and displaying respective history information according to an exemplary embodiment of this specification.

The display device 100 may include a display unit 110. The display unit 110 may include a first display unit 910 and a second display unit 920. At this point, the first display unit 910 may correspond to a unit configured to be adhered (or attached) to the display device 100 and to display visual information. Additionally, the second display unit 920 may correspond to a unit configured to receive application execution information by using the display device 100 and a communication unit and to display an execution screen of the application. More specifically, the second display unit 920 may correspond to an external device, which is configured separately from the display device and to display information on an application. Herein, the second display unit 920 may correspond to another electronic device, such as a TV, a computer, a smart phone, and so on, and examples of the second display unit 920 will not be limited only to the above-described exemplary embodiment.

The display device 100 may set up a first display area in the first display unit 910, and the display device 100 may set up a second display area in the second display unit 920. The display device 100 may set up history information based upon an application execution screen, which is displayed on the second display area of the second display unit 920. The display device 100 may display a history screen including history information. At this point, for example, the display device 100 may change the display property of the history information corresponding to the application execution screen, which is displayed on the second display area, and, then, the display device may display the history information accordingly. For example, the display device 100 may display the history information based upon a position relation between the first display unit 910 and the second display unit 920. Moreover, the display device 100 may adjust the size of the history information based upon the size of the second display unit 920, and this will not be limited only to the above-described exemplary embodiment.

For example, referring to FIG. 9, the second display unit 920 may correspond to a TV. At this point, the second display area may be set up in the TV. In case the display device 100 is set to the expand area mode, which displays the application execution screen in the first display area and the second display area, the display device 100 may display history information including execution screen information of the application being displayed on the TV. At this point, for example, the second display area, which is set up in the TV, may be larger than the first display area. The display device 100 may display the history information corresponding to the application execution screen, which is displayed in the second display area, to a larger display size. More specifically, the display device 100 may adjust the display properties of the history information based upon the characteristics of the application execution screen being displayed on the TV.

Figure 10:
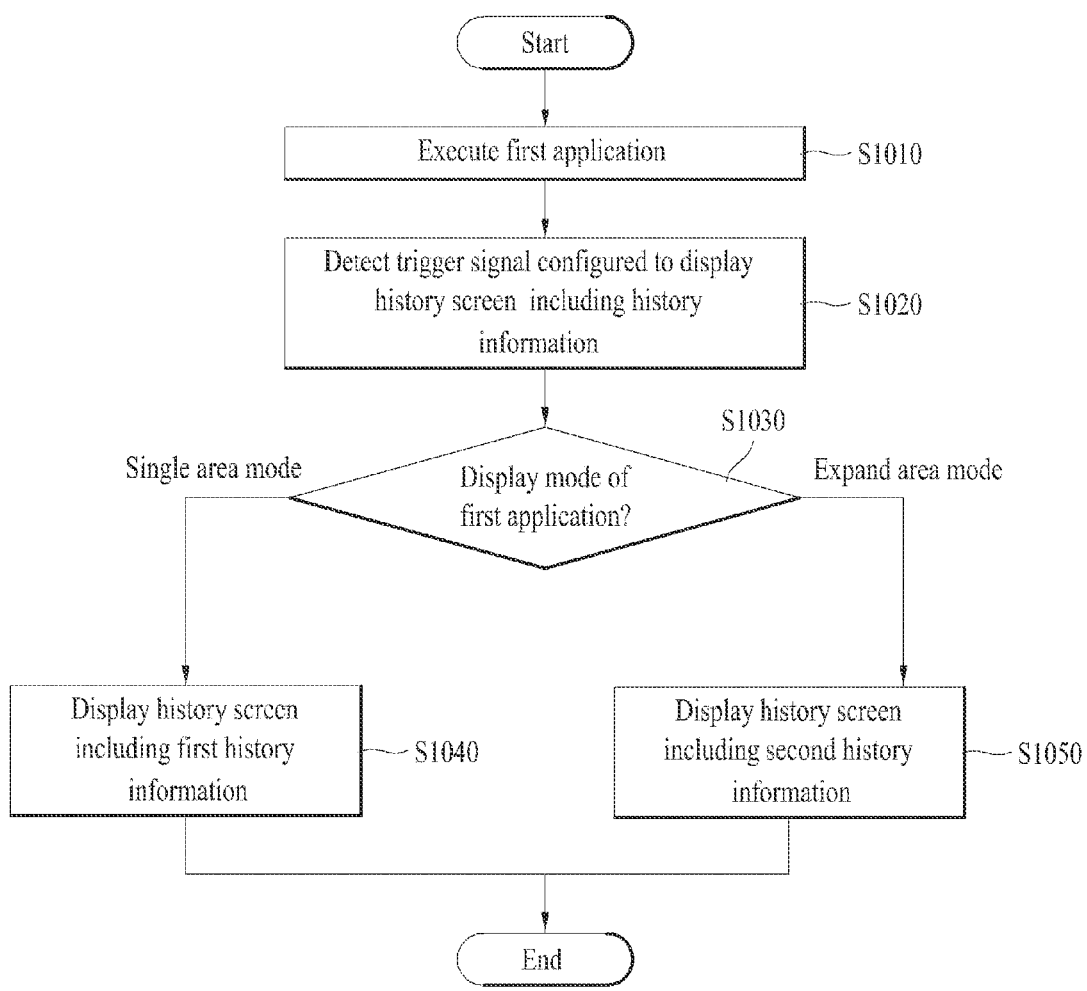
FIG. 10 illustrates a method for controlling a display device according to an exemplary embodiment of this specification.

FIG. 10 illustrates a method for controlling a display device according to an exemplary embodiment of this specification.

The display device 100 may execute a first application (S1010). As described above with reference to FIG. 1, the first application may correspond to contents being executed by the display device 100. Additionally, for example, the first application may correspond to software being executed by the display device 100. Moreover, the first application may correspond to a program including visual information and being designed to be displayed on the display unit 110. However, this will not be limited only to the exemplary embodiments presented herein. In case the display device 100 executes the first application, the display device 100 may display an execution screen of the first application on the display unit 110. At this point, the display unit 110 may include a first display area and a second display area.

Subsequently, the display device 100 may detect a trigger signal, which displays a history screen including history information (S1020). As described above with reference to FIG. 2, the history information may correspond to information having its display properties respective to the information on the first application, which is executed by the display device 100, modified. Herein, the display properties may correspond to at least one of size, shape, and display position of the history information. Moreover, the display property may correspond to a color in which the history information is being displayed, a related phrase (or text), and so on. More specifically, the display property may correspond to a consistently modified information format configured to indicate information on the first application. However, examples of the display property will not be limited only to the above-described exemplary embodiments.

Additionally, the history information may be set up (or determined) based upon a display mode. At this point, the display mode may be set up based upon a display area in which the display device 100 displays the visual information. Moreover, as described above with reference to FIG. 1, the trigger signal may correspond to a signal being detected by using the sensor unit 120.

Thereafter, the display device 100 may detect a display mode of the first application (S1030). As described above with reference to FIG. 1, the display mode may correspond to a single area mode. The single area mode may correspond to a display mode configured to selectively display visual information on any one of the first display area and the second display area. More specifically, in the single display mode, the display device 100 may display visual information on only one of the multiple display areas. Additionally, for example, the display device 100 may include multiple display areas consisting of at least two or more display areas. Herein, the single area mode may correspond to a display mode configured to display visual information on only one of the multiple display areas. Additionally, the display mode may correspond to an expand area mode. At this point, the expand area mode may correspond to a display mode configured to display visual information on both the first display area and the second display area. More specifically, in the expand display mode, the display device 100 may display visual information on all of the multiple display areas. Additionally, for example, the display device 100 may include multiple display areas consisting of at least two or more display areas. Herein, the expand area mode may correspond to a display mode configured to display visual information on all of the multiple display areas. Additionally, for example, when the display device 100 includes multiple display areas consisting of at least two or more display areas, the display device 100 may set up the display mode differently in accordance with the display area displaying the visual information. However, this will not be limited only to the above-described exemplary embodiment.

Subsequently, in the single area mode, the display device 100 may display a history screen including first history information (S1040). As described above with reference to FIG. 4*a* and FIG. 4*b*, in case the execution screen of the first application is displayed only in the first display area 410, the display device 100 may display the history information corresponding to the execution screen of the first application in a first position. Also, in case the execution screen of the first application is displayed only in the second display area 420, the display device 100 may display the history information corresponding to the execution screen of the first application in a second position. At this point, the first position and the second position may be decided based upon a position relation corresponding to the display area. More specifically, the first position and the second position may be set up in the same format as the position relation between the first display area 410 and the second display area 420.

Thereafter, in the expand area mode, the display device 100 may display a history screen including second history information (S1050). As described above with reference to FIG. 4*a* and FIG. 4*b*, in case the execution screen of the first application is displayed in both the first display area 410 and the second display area 420, among the execution screens of the first application, the display device 100 may display the history information corresponding to the execution screen, which is displayed in the first display area 410, in the first position. Also, in case the execution screen of the first application is displayed in both the first display area 410 and the second display area 420, among the execution screens of the first application, the display device 100 may display the history information corresponding to the execution screen, which is displayed in the second display area 420, in the second position. More specifically, the display device 100 may display the history information of the execution screen being displayed on the first display area 410 in the first position, and the display device 100 may display the history information of the execution screen being displayed on the second display area 420 in the second position.

Furthermore, although the drawings have been distinguished and divided in order to facilitate the description of this specification, this specification may provide a design for configuring a new embodiment by combining some of the previously described embodiments of this specification. Moreover, whenever required by anyone skilled in the art, the scope of this specification includes designing a recording medium readable by a computer, the computer having a program for executing the above-described embodiments of this specification recorded therein.

The display device providing history information and the method for controlling the same according to this specification may not be limited only to the above-described configuration and methods according to the exemplary embodiments of this specification. Accordingly, variations of the exemplary embodiments of this specification may be configured by selectively combining each exemplary embodiment of this specification fully or in part.

Meanwhile, display device 100 providing history information and the method for controlling the same according to this specification may be realized as a code that can be read by a processor, which is provided in a network device, in a recording medium that can be read by a processor. The recording medium that can be read by the processor includes all types of recording devices storing data that can be read by the processor. Examples of the recording media that can be read by a processor may include ROMs, RAMs, magnetic tapes, floppy disks, optical data storing devices, and so on. Also, an exemplary recording medium being realized in the form of a carrier wave, such as a transmission via Internet, may also be included. Also, the recording medium that can be read by a processor may be scattered within a computer system, which is connected through a network. And, a code that can be read by the processor may be stored and executed by using a dispersion (or scattering) method.

As described above, the display device providing history information and the method for controlling the same have the following advantages. According to this specification, the display device may include multiple display areas and may provide history information based upon an area in which an execution screen of an application is being displayed. Additionally, according to this specification, the display device may provide a method of differently displaying display properties of the history information, and the display device may also provide a method for adjusting positions in which the history information is being displayed based upon the area in which the application execution screen is being displayed.

Moreover, according to this specification, the display device may also provide a method for adjusting a size of the history information based upon the area in which the application execution screen is being displayed. And, according to this specification, the display device may provide a method for executing multiple applications and displaying multiple sets of history information. According to this specification, the display device may provide a method for executing multiple display modes and displaying multiple sets of history information.

Furthermore, according to this specification, the display device may provide a method for categorizing history information based upon display properties of the history information. And, finally, according to this specification, the display device is to provide a method for displaying an application execution screen on an external device and displaying history information corresponding to the external device.

It will be apparent to those skilled in the art that various modifications and variations can be made in this specification without departing from the spirit or scope of this specification. Thus, it is intended that this specification covers the modifications and variations of this invention provided they come within the scope of the appended claims and their equivalents. It is also apparent that such variations of this specification are not to be understood individually or separately from the technical scope or spirit of this specification.

Also, a device invention and a method invention are both described in this specification. Therefore, whenever required, the description of both inventions may be supplementarily applied.

What is claimed is:

1. A display device, comprising:
a display unit configured to display an execution screen of an application, wherein the display unit includes a first display area and a second display area, and the execution screen of the application is displayed in at least one of the first display area and the second display area;
a sensor unit configured to detect an input signal and to deliver the detected input signal to a processor; and
the processor configured to display a history screen including history information corresponding to the executed application, wherein the history information is set up based upon a display mode, and the display mode is set up based upon a display area in which the execution screen of the executed application is being displayed,
wherein the processor is further configured to:
execute a first application,
when a trigger signal configured to display the history screen is detected, display first history information if the display mode of the first application corresponds to a single area mode, and display second history information if the display mode of the first application corresponds to an expand area mode, and
wherein the first history information has a display property different from the display property of the second history information.

2. The display device of claim 1, wherein the display property includes at least one of a size, shape, and display position of the history information.

3. The display device of claim 1, wherein the single area mode corresponds to a display mode configured to selectively display the execution screen of the first application on any one of the first display area and the second display area.

4. The display device of claim 1, wherein the expand area mode corresponds to a display mode configured to display the execution screen of the first application on both the first display area and the second display area.

5. The display device of claim 1, wherein the processor is further configured to:
display the first history information in a first position, when displaying the execution screen of the first application in the first display area in the single area mode, and
display the first history information in a second position, when displaying the execution screen of the first application in the second display area in the single area mode.

6. The display device of claim 5, wherein the processor is further configured to:
when displaying the execution screen of the first application in the expand area mode,
display history information, among the second history information, corresponding to the execution screen displayed on the first display area in the first position, and
display history information, among the second history information, corresponding to the execution screen displayed on the second display area in the second position.

7. The display device of claim 6, wherein, when the history screen is being displayed in the single area mode, the first position and the second position are located within any one of the first display area and the second display area.

8. The display device of claim 6, wherein, when the history screen is being displayed in the expand area mode, the first position is located within the first display area, and the second position is located within the second display area.

9. The display device of claim 6, wherein the second display area corresponds to an area expanded from the first display area, and wherein the processor is further configured to decide the first position and the second position based upon a direction along which the second display area is being expanded.

10. The display device of claim 1, wherein the history information corresponds to information of the displayed application execution screen being reduced by a reference ratio.

11. The display device of claim 1, wherein the processor is further configured to: executes a second application, when the trigger signal configured to display the history screen is detected, display the first application history information and the second application history information based upon an execution order of the first application and the second application.

12. The display device of claim 11, wherein the processor is further configured to:
when the first application is executed before the second application, display the history information of the first application at a higher priority level than the history information of the second application.

13. The display device of claim 1, wherein the processor is further configured to:
when the display mode is changed while the first application is being executed, and the trigger signal configured to display the history screen is detected, display the history information corresponding to the changed display mode in the first application.

14. The display device of claim 1, wherein the processor is further configured to:
when the display mode is changed while the first application is being executed, and the trigger signal configured to display the history screen is detected, display both the history information corresponding to the display mode prior to being changed and the history information corresponding to the display mode after being changed.

15. The display device of claim 1, wherein the processor is further configured to:
detect a categorization trigger signal when the history screen including multiple sets of history information is being displayed, and
categorize the multiple sets of history information by using the display property based upon the detected categorization trigger signal.

16. The display device of claim 15, wherein the processor is further configured to:
when a first categorization trigger signal is detected, select history information having a first display property, among the multiple sets of history information, and display the selected history information, and
when a second categorization trigger signal is detected, select history information having a second display property, among the multiple sets of history information, and display the selected history information.

17. The display device of claim 16, wherein the first display property corresponds to the display property respective to the first history information, and
wherein the second display property corresponds to the display property respective to the second history information.

18. The display device of claim 1, further comprising:
a communication unit configured to communicate with an external device.

19. The display device of claim 18, wherein the display unit is comprised of a first display unit including the first display area and a second display unit including the second display area, and
wherein the second display unit receive information on the execution screen of the application by using the communication unit, and display the execution screen of the application based on the received information.

20. A method for controlling a display device, comprising:
executing a first application and displaying an execution screen of the first application on a display unit, wherein the display unit includes a first display area and a second display area, and the execution screen of the application is displayed in at least one of the first display area and the second display area; and
displaying a history screen including history information of the first application, wherein the history information is set up based upon a display mode, and the display mode is set up based upon a display area in which the execution screen of the executed application is being displayed,
wherein first history information is displayed when the display mode of the first application corresponds to a single area mode, second history information is displayed when the display mode of the first application corresponds to an expand area mode, and
wherein the first history information has a display property different from the display property of the second history information.

* * * * *